(12) United States Patent
Jewess et al.

(10) Patent No.: US 8,387,357 B2
(45) Date of Patent: Mar. 5, 2013

(54) RECUPERATED BYPASS TURBINE ENGINE

(75) Inventors: Gordon F Jewess, San Diego, CA (US); Charles Travelbee, San Diego, CA (US)

(73) Assignee: Pratt & Whitney, East Hartford, CT (US)

(*) Notice: Subject to any disclaimer, the term of this patent is extended or adjusted under 35 U.S.C. 154(b) by 1023 days.

(21) Appl. No.: 12/189,908

(22) Filed: Aug. 12, 2008

(65) Prior Publication Data

US 2010/0037623 A1   Feb. 18, 2010

(51) Int. Cl.
  *F02C 7/10* (2006.01)
  *F02K 3/02* (2006.01)
(52) U.S. Cl. .................... 60/39.511; 60/226.1
(58) Field of Classification Search ............ 60/226.1, 60/262, 770, 39.511, 226.3, 266, 267
  See application file for complete search history.

(56) References Cited

U.S. PATENT DOCUMENTS

| | | | |
|---|---|---|---|
| 3,589,132 A * | 6/1971 | Du Pont ............... | 60/262 |
| 4,112,677 A * | 9/1978 | Kasmarik ............. | 60/226.1 |
| 4,222,235 A * | 9/1980 | Adamson et al. ..... | 60/226.1 |
| 5,237,817 A * | 8/1993 | Bornemisza et al. ... | 60/226.1 |
| 5,454,222 A * | 10/1995 | Dev ..................... | 60/806 |
| 5,832,715 A * | 11/1998 | Dev ..................... | 60/804 |
| 6,134,880 A * | 10/2000 | Yoshinaka ........... | 60/226.1 |
| 6,158,210 A * | 12/2000 | Orlando ............... | 60/226.1 |
| 6,895,741 B2 * | 5/2005 | Rago et al. ............ | 60/226.1 |
| 2004/0025495 A1 * | 2/2004 | Dev ..................... | 60/226.1 |
| 2005/0060983 A1 * | 3/2005 | Lardellier ............. | 60/226.1 |
| 2005/0178105 A1 * | 8/2005 | Kawamoto et al. .... | 60/226.1 |

* cited by examiner

*Primary Examiner* — Gerald Sung
(74) *Attorney, Agent, or Firm* — Stephen G. Mican

(57) ABSTRACT

A by-pass turbofan gas turbine engine, has a by-pass fan, a generally annular core engine duct, a generally annular by-pass duct situated in a generally coaxial relationship with the core engine duct coupled to the by-pass fan, an upstream axial compressor coupled to the core engine duct, a downstream radial compressor coupled to the upstream compressor, a generally annular recuperator with a cool side inlet coupled to the downstream compressor, a generally annular combustor coupled to a cool side outlet of the recuperator, a radial turbine coupled to the combustor and a warm side inlet of the recuperator coupled to the radial turbine, at least one exhaust nozzle coupled to a warm side outlet of the recuperator that discharges into the by-pass duct and a propelling nozzle coupled to the by-pass duct.

23 Claims, 1 Drawing Sheet

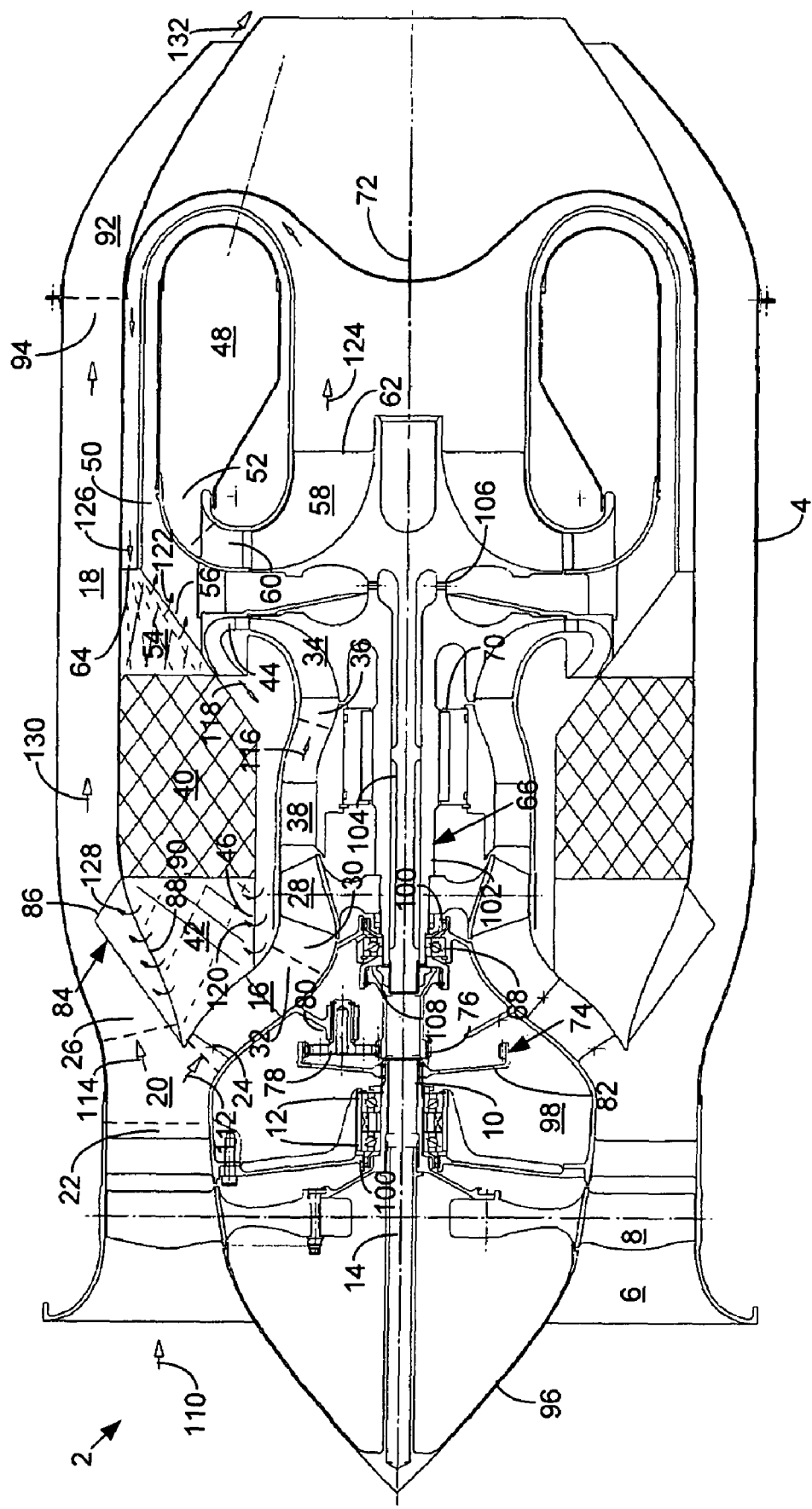

RECUPERATED BYPASS TURBINE ENGINE

FIELD OF THE INVENTION

The invention relates to miniature gas turbine engines, and more particularly to miniature gas turbine engines of the turbofan type.

BACKGROUND OF THE INVENTION

There is a growing demand for miniature gas turbine engines of high efficiency for unmanned aeronautical vehicles (UAVs). There is also a need for a simple and low cost engine that provides specific fuel consumption (SFC), such as rated in pounds mass of fuel used per hour per pound force of thrust, of less than one.

SUMMARY OF THE INVENTION

The invention generally comprises a by-pass turbofan gas turbine engine, comprising: a by-pass fan with a by-pass fan outlet; a generally annular core engine duct with a core engine duct inlet coupled to the by-pass fan outlet and a core engine duct outlet; a generally annular by-pass duct situated in a generally coaxial relationship with the core engine duct with a by-pass duct inlet coupled to the by-pass fan outlet and a by-pass duct outlet; an upstream axial compressor with an axial upstream compressor inlet coupled to the core engine duct outlet and an axial upstream compressor outlet; a downstream radial compressor with an axial downstream compressor inlet coupled to the upstream compressor outlet and a radial downstream compressor outlet; a generally annular recuperator with a cool side inlet coupled to the downstream compressor outlet, a cool side outlet, a warm side inlet and a warm side outlet; a generally annular combustor with a combustor inlet coupled to the recuperator cool side outlet and a combustor outlet; a radial turbine with a radial turbine inlet coupled to the combustor inlet and a turbine outlet coupled to the recuperator warm side inlet; at least one exhaust nozzle with an exhaust nozzle inlet coupled to the recuperator warm side outlet and an exhaust nozzle outlet that discharges into the by-pass duct between the by-pass duct inlet and outlet; and a propelling nozzle coupled to the by-pass duct outlet.

DESCRIPTION OF THE DRAWINGS

FIG. 1 is a cut-away side view of a by-pass turbofan gas turbine engine according to a possible embodiment of the invention.

DETAILED DESCRIPTION OF THE INVENTION

FIG. 1 is a cut-away side view of a by-pass turbofan gas turbine engine 2 according to a possible embodiment of the invention. The engine 2 has a generally cylindrical housing 4 with a generally circular air inlet 6. A by-pass fan 8 situated downstream of the engine inlet 6 attaches to a fan shaft 10. Fan shaft bearings 12 allow the fan shaft 10 to rotate about a fan axis of rotation 14.

The engine 2 has a generally annular core engine duct 16 and a generally annular by-pass duct 18 situated in a generally coaxial relationship with the core engine duct 16. A manifold 20 couples an outlet 22 of the by-pass fan 8 to an inlet 24 of the core engine duct 16 and an inlet 26 of the by-pass duct 18.

An upstream axial compressor 28 has a generally annular inlet 30 coupled to an outlet 32 of the core engine duct 16. A downstream radial compressor 34 has a generally annular inlet 36 that couples to a generally annular outlet 38 of the upstream compressor 28.

A generally annular recuperator 40 bordered by the by-pass duct 18 borders the upstream compressor 28 and the downstream compressor 34. A recuperator upstream baffle 42 couples a generally radial outlet 44 of the downstream compressor 34 to a cool side inlet 46 of the recuperator 40.

A generally annular combustor 48 has a generally annular inlet 50 and a generally radial outlet 52. A recuperator downstream baffle 54 couples the combustor inlet 50 to a cool side outlet 56 of the recuperator 40.

A radial turbine 58 has a generally radial inlet 60 that couples to the combustor outlet 52. The recuperator downstream baffle 54 couples an output 62 of the radial turbine 58 to a warm side inlet 64 of the recuperator 40.

A drive shaft 66 couples the radial turbine 58 to the upstream compressor 28 and the downstream compressor 34. A forward drive shaft thrust bearing 68 and a rearward drive shaft bearing 70 allow the drive shaft 66 to rotate about a drive shaft axis of rotation 72. The forward thrust bearing 68 also prevents axial movement of the drive shaft 66. Preferably, the drive shaft axis of rotation 72 is substantially coincident with the fan shaft axis of rotation 14.

An epicyclic gear train 74 may couple the fan shaft 10 to the drive shaft 66 to allow the fan shaft 10 to rotate at a fraction of the rotational velocity of the drive shaft 66. In this case, the drive shaft 66 attaches to a sun gear 76 that drives multiple star gears 78 mounted in a fixed carrier 80 that in turn drive a ring gear 82 that attaches to the fan shaft 10.

At least one exhaust nozzle 84 has an outlet 86 that extends into the by-pass duct 18. The recuperator upstream baffle 42 couples a warm side outlet 88 of the recuperator 40 to an inlet 90 of each exhaust nozzle 84. Preferably, multiple nozzles 84 extend in an annular arrangement about the by-pass duct 18 to serve as mixer flutes. A propulsion nozzle 92 couples to an outlet 94 of the by-pass duct outlet.

The fan 8 may have a central fairing 96 to improve streamlining. The fan shaft bearings 12 are preferably spring loaded. A gear box 98 may contain the fan shaft bearings 12, the epicyclic gear train 74 and the forward drive shaft thrust bearing 68 so that lubrication oil within the gear box 98 may lubricate these components. Distribution of lubrication oil within the gear box 98 may be by means of splash lubrication or pressure lubrication by means of a mechanically or electrically powered lubrication oil pump (not shown). Shaft seals 100 preferably seal each end of the gear box 98. The rearward drive shaft bearing 70 may conveniently be of the air bearing type so that it requires no lubrication oil.

The recuperator 40 may be of any desired construction that is compatible with the gas flow rates and temperature ranges of the engine 2, and preferably it may be of a carbon-carbon construction for combining high efficiency with low mass. The combustor 48 is preferably a brazed assembly. Engine starting may be by any convenient means (not shown), such as by means of a pyro-start cartridge or electric ignition, supplemented by an oxygen source if necessary, such as during high-altitude starting.

The drive shaft 66 preferably comprises a two piece, concentric design, with an outer hollow section 102 that couples to the epicyclic gear train 74, the upstream compressor 28 and the downstream compressor 34, and an inner solid shaft section 104 that couples to the turbine 58. The inner section 104 preferably couples to the outer section 102 by means of a curvic coupling 106 proximate the turbine and a tie bolt connector 108 proximate the epicyclic gear train 74.

The engine 2 intakes air by means of the engine inlet 6, as represented by arrow 110. The bypass fan 8 compresses the intake air to a first low pressure level and the manifold distributes resultant low pressure air flow between the core engine duct 16, as represented by arrow 112, and the by-pass duct, represented by arrow 114. The upstream compressor 28 compresses the low pressure core engine air flow to a medium pressure core engine air flow, as represented by arrow 116. The downstream compressor compresses the medium core engine air flow to a high pressure core engine air flow, as represented by arrow 118.

The upstream baffle 42 directs the high pressure core engine air flow through the cool side of the recuperator 40, as represented by arrows 120. The recuperator 40 warms the high pressure core engine air flow and the downstream baffle 54 directs the warmed high pressure core engine air flow into the combustor 48, as represented by arrows 122. The combustor 48 mixes fuel with the warmed high pressure core engine air flow, ignites the mixture, and drives the turbine 58, as represented by arrow 124. The turbine 58 drives the upstream compressor 28 and the downstream compressor 34 by way of the drive shaft 66, as well as the fan 8 by way of the epicyclic gear train 74 and the fan shaft 10.

The downstream baffle 54 directs the turbine gas flow through the warm side of the recuperator 40, as represented by arrow 126. The recuperator 40 cools the turbine gas flow and the upstream baffle 42 directs the cooled turbine gas flow into each exhaust nozzle 84, as represented by arrow 128. The exhaust nozzles 84 serve as mixing nozzles that mix the high pressure cooled turbine gas flow with the low pressure by-pass duct air flow, as represented by arrow 130. The propulsion nozzle 92 receives the mixed turbine gas/by-pass air flow and discharges it, as represented by arrow 132. Mixing the high pressure cooled turbine gas flow from the exhaust nozzles 84 with the low pressure by-pass duct air flow in the by-pass fan duct 18 provides thorough mixing and a low noise and thermal signature for the engine 2.

The described embodiments of the invention are only some illustrative implementations of the invention wherein changes and substitutions of the various parts and arrangement thereof are within the scope of the invention as set forth in the attached claims.

The invention claimed is:

1. A by-pass turbofan gas turbine engine, comprising:
   a by-pass fan with a by-pass fan outlet;
   a generally annular core engine duct with a core engine duct inlet coupled to the by-pass fan outlet and a core engine duct outlet;
   a generally annular by-pass duct situated in a generally coaxial relationship with the core engine duct and with a by-pass duct inlet coupled to the by-pass fan outlet and a by-pass duct outlet;
   an upstream axial compressor with an axial upstream compressor inlet coupled to the core engine duct outlet and an axial upstream compressor outlet;
   a downstream radial compressor with an axial downstream compressor inlet coupled to the upstream compressor outlet and a radial downstream compressor outlet;
   a generally annular recuperator with a cool side inlet coupled to the downstream compressor outlet, a cool side outlet, a warm side inlet and a warm side outlet;
   a generally annular combustor with a combustor inlet coupled to the recuperator cool side outlet and a combustor outlet;
   a radial turbine with a radial turbine inlet coupled to the combustor outlet and a turbine outlet coupled to the recuperator warm side inlet;
   at least one exhaust nozzle with an exhaust nozzle inlet coupled to the recuperator warm side outlet and an exhaust nozzle outlet that discharges into the by-pass duct upstream of the axial upstream compressor outlet; and
   a propelling nozzle coupled to the by-pass duct outlet.

2. The engine of claim 1, wherein a manifold couples the by-pass fan outlet to the core engine duct inlet and the by-pass duct inlet.

3. The engine of claim 1, wherein the recuperator borders the upstream and downstream compressors.

4. The engine of claim 1, wherein the by-pass duct borders the recuperator.

5. The engine of claim 1, further comprising a drive shaft with a drive shaft axis of rotation that couples the turbine to the upstream compressor and the downstream compressor.

6. The engine of claim 5, wherein the by-pass fan couples to the drive shaft.

7. The engine of claim 6, further comprising an epicyclic gear train that couples the by-pass fan to the drive shaft, wherein the by-pass fan has a fan axis of rotation generally coincident with the drive shaft axis of rotation.

8. The engine of claim 1, further comprising an upstream baffle for coupling the downstream compressor outlet to the recuperator cool side inlet and the recuperator warm side outlet to each exhaust nozzle inlet.

9. The engine of claim 1, further comprising a downstream baffle for coupling the recuperator cool side outlet to the combustor inlet and the combustor outlet to the recuperator warm side inlet.

10. The engine of claim 1, wherein each exhaust nozzle comprises a mixing nozzle.

11. The engine of claim 1, wherein the each exhaust nozzle outlet is situated upstream of the recuperator.

12. A by-pass turbofan gas turbine engine, comprising:
   a by-pass fan with a by-pass fan outlet;
   a generally annular core engine duct with a core engine duct inlet and a core engine duct outlet;
   a generally annular by-pass duct situated in a generally coaxial relationship with the core engine duct and with a by-pass duct inlet and a by-pass duct outlet;
   a manifold that couples the by-pass fan outlet to the core engine duct inlet and the by-pass duct inlet;
   an upstream axial compressor with an axial upstream compressor inlet coupled to the core engine duct outlet and an axial upstream compressor outlet;
   a downstream radial compressor with an axial downstream compressor inlet coupled to the upstream compressor outlet and a radial downstream compressor outlet;
   a generally annular recuperator with a cool side inlet, a cool side outlet, a warm side inlet and a warm side outlet;
   a generally annular combustor with a combustor inlet and a combustor outlet;
   a radial turbine with a radial turbine inlet coupled to the combustor outlet and a turbine outlet;
   a drive shaft with a drive shaft axis of rotation that couples the turbine to the upstream compressor and the downstream compressor;
   at least one exhaust nozzle with an exhaust nozzle inlet coupled to an exhaust nozzle outlet that discharges into the by-pass duct upstream of the axial upstream compressor outlet;
   an upstream baffle that couples the downstream compressor outlet to the recuperator cool side inlet and the recuperator warm side outlet to each exhaust nozzle inlet;

a downstream baffle for coupling the recuperator cool side outlet to the combustor inlet and the combustor outlet to the recuperator warm side inlet; and a propelling nozzle coupled to the by-pass duct outlet.

13. The engine of claim 12, wherein the by-pass fan couples to the drive shaft.

14. The engine of claim 13, further comprising an epicyclic gear train that couples the by-pass fan to the drive shaft, wherein the by-pass fan has a fan axis of rotation generally coincident with the drive shaft axis of rotation.

15. The engine of claim 12, wherein the recuperator borders the upstream and downstream compressors.

16. The engine of claim 12, wherein the by-pass duct borders the recuperator.

17. The engine of claim 12, wherein each exhaust nozzle comprises a mixing nozzle.

18. The engine of claim 12, wherein the each exhaust nozzle outlet is situated upstream of the recuperator.

19. A by-pass turbofan gas turbine engine, comprising:

a by-pass fan with a by-pass fan axis of rotation and a by-pass fan outlet;

a generally annular core engine duct with a core engine duct inlet and a core engine duct outlet;

a generally annular by-pass duct situated in a generally coaxial relationship with the core engine duct and with a by-pass duct inlet and a by-pass duct outlet;

a manifold that couples the by-pass fan outlet to the core engine duct inlet and the by-pass duct inlet;

an upstream axial compressor with an axial upstream compressor inlet coupled to the core engine duct outlet and an axial upstream compressor outlet;

a downstream radial compressor with an axial downstream compressor inlet coupled to the upstream compressor outlet and a radial downstream compressor outlet;

a generally annular recuperator with a cool side inlet, a cool side outlet, a warm side inlet and a warm side outlet;

a generally annular combustor with a combustor inlet and a combustor outlet;

a radial turbine with a radial turbine inlet coupled to the combustor outlet and a turbine outlet;

a drive shaft with a drive shaft axis of rotation generally coincident with the fan axis of rotation that couples the turbine to the upstream compressor and the downstream compressor;

an epicyclic gear train that couples the by-pass fan to the drive shaft;

at least one exhaust nozzle with an exhaust nozzle inlet and an exhaust nozzle outlet that discharges into the by-pass duct upstream of the axial upstream compressor outlet;

an upstream baffle that couples the downstream compressor outlet to the recuperator cool side inlet and the recuperator warm side outlet to each exhaust nozzle inlet;

a downstream baffle for coupling the recuperator cool side outlet to the combustor inlet and the combustor outlet to the recuperator warm side inlet; and a propelling nozzle coupled to the by-pass duct outlet.

20. The engine of claim 19, wherein the recuperator borders the upstream and downstream compressors.

21. The engine of claim 19, wherein the by-pass duct borders the recuperator.

22. The engine of claim 19, wherein each exhaust nozzle comprises a mixing nozzle.

23. The engine of claim 19, wherein the each exhaust nozzle outlet is situated upstream of the recuperator.

* * * * *